US008479382B2

(12) United States Patent
Sarh

(10) Patent No.: US 8,479,382 B2
(45) Date of Patent: Jul. 9, 2013

(54) APPARATUS FOR INSTALLING FASTENERS

(75) Inventor: Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 13/160,069

(22) Filed: Jun. 14, 2011

(65) Prior Publication Data

US 2011/0239448 A1 Oct. 6, 2011

Related U.S. Application Data

(62) Division of application No. 11/697,361, filed on Apr. 6, 2007, now Pat. No. 8,006,362.

(51) Int. Cl.
*B23Q 7/10* (2006.01)

(52) U.S. Cl.
USPC ............................................................ 29/809

(58) Field of Classification Search
USPC .................. 29/809, 701, 703, 707, 709, 712, 29/718, 402.01, 525.01, 402.09, 402.14, 29/407.09, 431, 466, 33 R, 47, 48.5 A, 50, 29/52–55, 57, 65
See application file for complete search history.

(56) References Cited

U.S. PATENT DOCUMENTS

| | | | |
|---|---|---|---|
| 4,662,556 A | | 5/1987 | Gidlund |
| 4,674,949 A | * | 6/1987 | Kroczynski ................ 414/749.1 |
| 5,465,868 A | * | 11/1995 | Bonomi ........................ 221/165 |
| 5,727,300 A | * | 3/1998 | Ekdahl et al. ............. 29/407.04 |
| 6,357,101 B1 | | 3/2002 | Sarh et al. |
| 6,536,100 B2 | | 3/2003 | Sarh et al. |
| 7,305,748 B2 | | 12/2007 | Sprague et al. |
| 2006/0032554 A1 | | 2/2006 | Sprague et al. |
| 2008/0244888 A1 | | 10/2008 | Sarh |

FOREIGN PATENT DOCUMENTS

| | | |
|---|---|---|
| WO | 9301014 A1 | 1/1993 |
| WO | 2008124353 A1 | 10/2008 |

OTHER PUBLICATIONS

USPTO Office Action for U.S. Appl. No. 11/697,361 dated Nov. 10, 2010.
USPTO Notice of Allowance for U.S. Appl. No. 11/697,361 dated May 2, 2011.
PCT Report US 2008/058801, The Boeing Company, Jul. 8, 2008.

* cited by examiner

*Primary Examiner* — John C Hong
(74) *Attorney, Agent, or Firm* — Yee & Associates, P.C.

(57) ABSTRACT

Apparatus for installing fasteners in a workpiece is mounted for computer controlled movement over the workpiece surface. The apparatus includes all of the tools, fasteners, drives and controls on-board that are needed to operate autonomously, without external connections. The apparatus may also include an on-board power supply for powering the tools, drives and controls. A supply of fasteners is held in an on-board replaceable cassette. An on-board fastener transferring device transfers individual fasteners from the cassette to the tools.

32 Claims, 10 Drawing Sheets

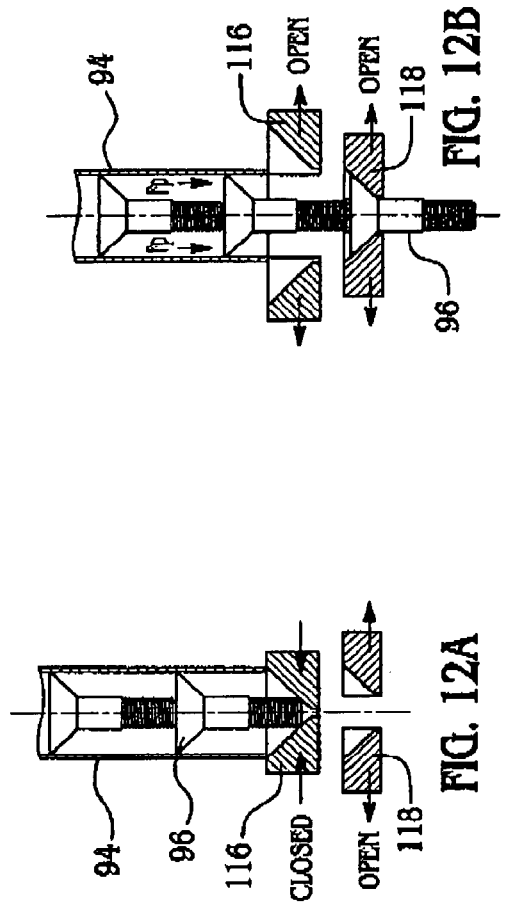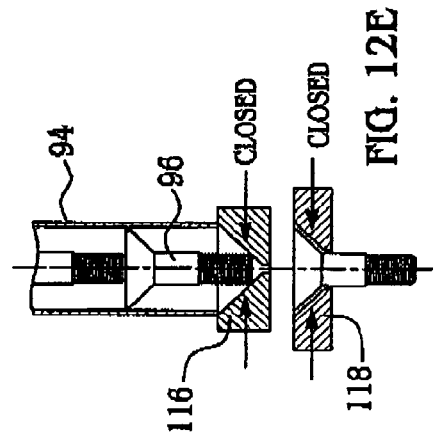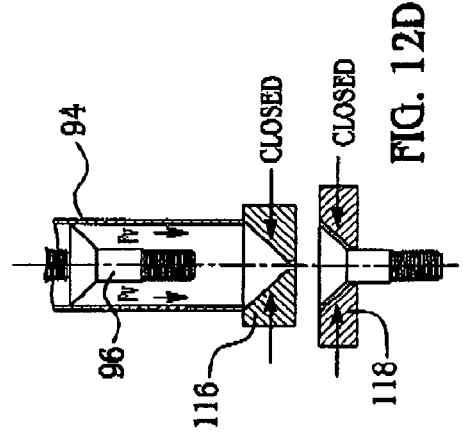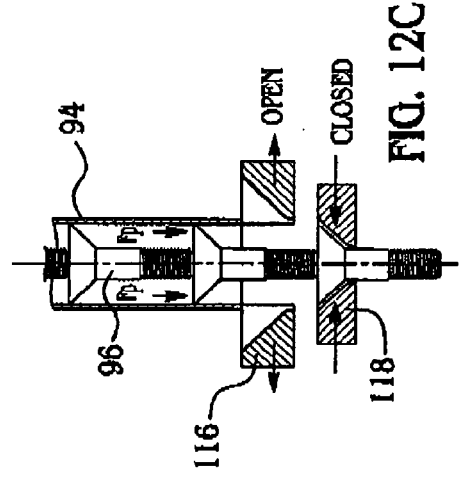

APPARATUS FOR INSTALLING FASTENERS

TECHNICAL FIELD

This disclosure generally relates to systems for installing fasteners in a workpiece, and deals more particularly with a method and related multi-function, autonomous apparatus having all of the on-board tools, fasteners and controls needed to automatically install fasteners in a workpiece.

BACKGROUND

In the production assembly of aircraft, the outer skin may be joined to fuselage frames, wing spars and ribs using a variety of fasteners. The fasteners may be of differing types, with variations in diameters and grip lengths. These fasteners may be installed using semi-automated equipment that may include one or more tools mounted on a base. The base may be mounted for movement over the outer skin to different positions where fasteners are to be installed. The equipment described above may install fasteners in either longitudinal or radial joints, under computer control. Some of the subsystems of this equipment are positioned on the factory floor, away from the base and are connected to tools and drives on the base by hoses and/or wire bundles. For example, computer controls, electromechanical valves, pneumatic logic, power supplies and a supply of fasteners are typically located on the factory floor and are connected to the machine base using the hoses and wire bundles mentioned above.

The use of hoses and wire bundles to connect the fastener installation equipment to off-board subsystems results in a relatively complex system, may require frequent equipment maintenance and displaces factory floor space. Moreover, feeding fasteners from an off-board supply of fasteners through hoses can result in misfeeds, in which fasteners become clogged in the hoses, prompting the need for intervention by factory personnel and resulting accompanying production downtime.

Accordingly, there is a need for a fastener installation apparatus which obviates the problems mentioned above and integrates all of the systems and sub-systems onboard that are needed to allow the apparatus to function autonomously, without connections to sub-systems on the factory floor. The illustrated embodiments of the disclosure are directed towards satisfying this need.

SUMMARY

Embodiments of the disclosure provide a fastener installation apparatus capable of operating autonomously without connections to subsystems on the factory floor. The elimination of hoses and wire bundles to connect the apparatus with subsystems frees up factory floor space, reduces overall complexity of the equipment and may decrease maintenance requirements. An on-board cassette may contain all of the types and sizes of fasteners required to make longitudinal or radial connections between the skin and aircraft frame and/or stiffener components.

In accordance with one disclosed embodiment, an apparatus is provided for installing fasteners in a workpiece, comprising: a base; a supply of fasteners mounted on the base; means for mounting the base for movement over the surface of the workpiece; at least one tool mounted on the base for installing the fasteners in the workpiece along an installation path; and controls mounted on the base for controlling the operation of the tool. The fastener supply may include a cassette having a plurality of cartridges, each holding a plurality of fasteners. In one implementation, the cartridges may include tubes for holding the fasteners in end-to-end relationship to each other and a valve for controlling the dispensing of individual fasteners. In another implementation, the cartridges include a moveable ribbon to which the fasteners are releasably attached. A fastener transferring device may include jaws that remove individual fasteners from the cassette and transfer the fasteners to a position aligned with the installation path where the tool may insert the fastener through a hole in the workpiece. The apparatus may further include a plurality of tools mounted on the base for performing various operations related to fastener installation, and means for shifting each of the tools from a standby position to an operating position. The base-mounted controls may include a programmed computer for controlling the operation of the tool and movement of the base over the surface of the workpiece.

According to another illustrated embodiment, an autonomous apparatus is provided for installing fasteners in a workpiece. The autonomous apparatus comprises a base including a process station where fastener installation processes are performed; a drive assembly for moving the base over the workpiece; a supply of fasteners mounted on the base; a fastener transferring device mounted on the base for transferring fasteners from the fastener supply to the process station; a plurality of tools mounted on the base for performing fastener installation operations; means for shifting each of the tools from a standby position to the process station; and, controls mounted on the base for controlling the operation of at least one of the fastener transferring device, the tools and the drive assembly. The supply of fasteners may include a cassette removably mounted on the base and having a plurality of cartridges, each holding a plurality of fasteners. The apparatus may further comprise a power supply mounted on the base for supplying power to the drive assembly, the fastener transferring device, the tools and the tool shifting means. The tools may include a drill for drilling a hole in the workpiece, and a tool for inserting a fastener into the hole.

According to still another disclosed embodiment, an apparatus is provided for installing fasteners in a workpiece, comprising: a base mounted for movement over the surface of the workpiece; a tool mounted on the base for performing fastener installation operations on the workpiece; a magazine mounted on the base for holding a supply of fasteners; and, a device mounted on the base for transferring fasteners from the magazine to the tool. The magazine may include a cassette having a plurality of cartridges each containing a plurality of fasteners, and the fastener transferring device transfers individual fasteners from each of the cartridges to the tool. The cartridges may be removably mounted on the cassette, and the cassette may be removably mounted on the base using a quick release device to allow fastener replenishment.

According to a method embodiment of the disclosure, fasteners are installed in a workpiece by the steps comprising: mounting a base on the workpiece; moving the base to each of a plurality of locations on the workpiece where fasteners are to be installed; moving each of a plurality of tools on the base to a process station on the base; and performing fastener installation operations at the process station using the tools. Movement of the base over the workpiece as well as movement of the tools and dispensing of fasteners are controlled by commands issued on-board the base by a computer.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIGS. 12a-12e are cross sectional illustrations showing the progressive steps in dispensing fasteners from the fastener tubes illustrated in FIG. 9.

DETAILED DESCRIPTION

Figure 1:
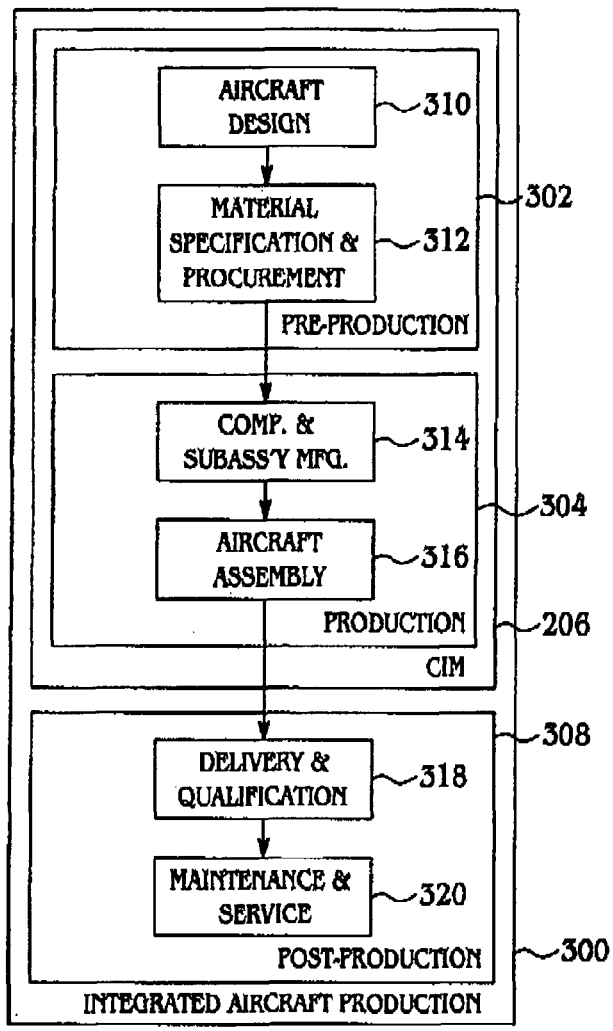
FIG. 1 illustrates an integrated aircraft production process.

FIG. 1 illustrates an integrated production process 300, in accordance with embodiments of the present disclosure. As used herein, integrated aircraft production process 300 also may include manufacturing, support, or both. Typically, process 300 includes a preproduction phase 302, a production phase 304, and a post-production phase 308. Preproduction phase 302 may include aircraft design, subassembly, and component design 310, and material specification and procurement 312. Material specification and procurement 312 may include selection and procurement of components fabricated, or subassemblies manufactured, by third parties, without limitation, vendors, subcontractors, or suppliers. Production phase 304 may include component fabrication or subassembly manufacturing 314, and aircraft assembly 316. Pre-production phase 302 and production phase 304 can be elements of an integrated manufacturing process 306, including one or more of aircraft and component design, development, and simulation processes; material, component, and subassembly specification and procurement processes; automated production planning processes; fabrication and assembly processes; and quality control processes.

Frequently, aspects of a modem aircraft production process, such as integrated process 300, do not end with final assembly but may extend over the service life of an aircraft, involving iterative and interactive collaborations between manufacturer, governmental authorities, customers and aircraft operators. Accordingly, integrated production process 300 can include post-production phase 308. Post-production phase 308 may include aircraft delivery and qualification 318, and aircraft service 320. Aircraft delivery and qualification 318 may include providing an aircraft to customer specifications, which may have changed after an aircraft was assembled. Thus, delivery and qualification can include rework, modification, or revision of one or more elements of an aircraft after delivery to a customer or operator. Also, it may be desirable to perform a modification, a rework, or an upgrade to an aircraft in the service interval between aircraft delivery and retirement. Therefore, aircraft service 320 can include rework, modification, or upgrade of a portion of an airframe, including an airframe manufactured or assembled using traditional, pre-existing materials, components, or subassemblies.

Apparatus and methods embodied herein may be employed during integrated production process 300 in one or more of phases 302, 304, or 308. For example, components or subassemblies corresponding to production phase 304 may be fabricated or manufactured in a manner similar to components or subassemblies procured during preproduction phase 302, and vice versa. Also, one or more of an apparatus embodiment, a method embodiment, or a combination thereof may be of particular benefit during production phase 304, for example, by substantially expediting assembly of an aircraft. One or more of an apparatus embodiment, a method embodiment or a combination thereof may be of benefit during post-production phase 308, for example, without limitation, to rework during delivery and qualification 318 and/or maintenance and service 320.

Figure 2:
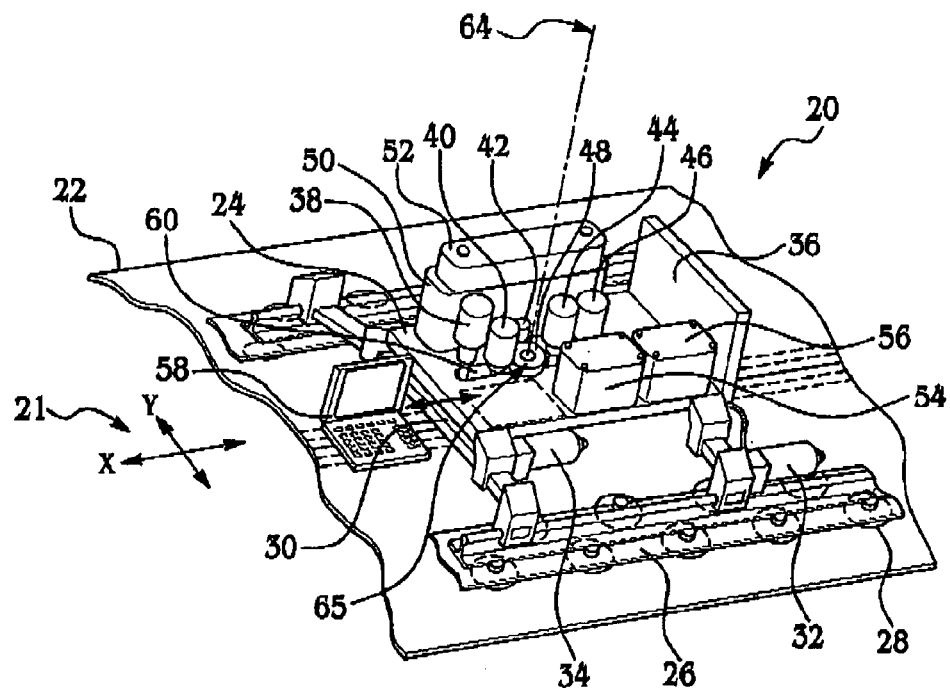
FIG. 2 is a perspective illustration of an autonomous apparatus for installing fasteners in a workpiece, mounted on a skin panel of an aircraft, the position of an onboard computer having been shifted slightly for purposes of clarity.

Referring to FIG. 2, autonomous apparatus for installing fasteners generally indicated by the numeral 20 may be used in one or more of the phases 302, 304, 308 of the integrated production process 300 described above. The autonomous apparatus 20 may include a platform-like base 24 that may be a flat plate mounted for movement along X and Y axes 21 over the surface of a workpiece, such as an aircraft skin 22. As will be discussed below in more detail, the apparatus 20 may function to install any of a variety of types and sizes of fasteners in the skin 22 in order to secure the skin 22 to underlying frame members, reinforcements or supports (not shown). It should be noted here that although the apparatus 20 will be described in reference to its application to aircraft assembly operations, it may be used to install fasteners in a wide variety of other workpieces and fastener installation applications. The term "installation" as used herein is intended to include a wide variety of processes related to the installation of fasteners, including but not limited to preparing the workpiece to receive a fastener and placing the fastener in the workpiece. "Installation" may or may not include securing the fastener to the workpiece, as by deforming a rivet fastener or threading a nut onto a screw fastener.

The base 24 may be mounted on a pair of spaced apart guide rails 30 for sliding movement in the Y direction. The guide rails 30, in turn may be slideably mounted for linear movement in the X direction, on a pair of spaced apart mounting rails 26. Mounting rails 26 may be releasably mounted on the skin 22 by suction cups 28. An electric or pneumatic motor 32 drives the base 24 in the X direction, while similarly, electric or pneumatic motor 34 drives the base 24 in the Y direction. The base 24 may be provided with an optional crescent mounting plate 36 that allows the base 24 to be mounted on a later discussed crescent in order to install fasteners forming radial joints.

Mounted on the base 24 are all the components necessary to allow the apparatus 20 to operate autonomously without the need for hoses, lines or wire bundles connecting the apparatus 20 with systems on a surrounding factory floor (not shown). A supply of fasteners in the form of a fastener magazine 50 may be mounted on the base 24, and may include a magazine selection system 52 that selects and moves individual fasteners to a process station 65. The fastener magazine 50 may be preloaded with differing types and sizes of fasteners as required for a particular application. Five tools 38, 40, 42, 44, 46 are mounted on the base 24 for movement between a standby position, and an operating position as will be described later.

Tool 38 may comprise a pneumatic or electrically operated inserter for inserting fasteners along a process axis 64 into a hole formed in the skin 22. Tool 40 may comprise a chip removal system, which may use a vacuum to remove chips and other debris that have been formed as a result of drilling a hole in the skin 22. Tool 42 may comprise a hole probe for checking the diameter of a hole that has been drilled. Tool 44 may comprise a drill that includes a countersink drill bit 180 (FIG. 15) that drills a countersunk hole in the skin 22 along the process axis 64. Tool 46 may comprise a device such as a vision system used in aligning the base 24 on the skin 22 such that the process axis 64 is aligned with the location on the skin 22 where a fastener is to be installed.

A ring shaped electromagnet 48 may be mounted on the base 24 at the process station 65 such that its central opening is aligned with the process axis 64. The electromagnet 48 functions to temporarily clamp the base 24 on the skin 22 during a fastening installation operation, as will be discussed in more detail below. The base 24 may include a slot 60 intersecting the process axis 64 to allow lower portions of the tools 38, 40, 42, 44, 46 to pass downwardly through the base 24 into proximity with the skin 22.

A control box 54 mounted on the base 24 may contain various components used to control fastener selection and installation operations. For example, control box 54 may include circuit boards, relays, servo valves, pneumatic logic and similar components (all not shown) that form part of an on-board control system.

The autonomous apparatus 20 shown in FIG. 2 may be self-powered by an onboard battery 56 mounted on the platform 24, thus obviating the need for connections to external power supplies. A programmed controller, such as a portable personal computer 58 may be mounted on the platform 24 to allow programming and control of all on-board systems of the apparatus 20, including control of the drive motors 32, 34 which index the platform 24 to preprogrammed positions on the skin 22.

Figure 3:
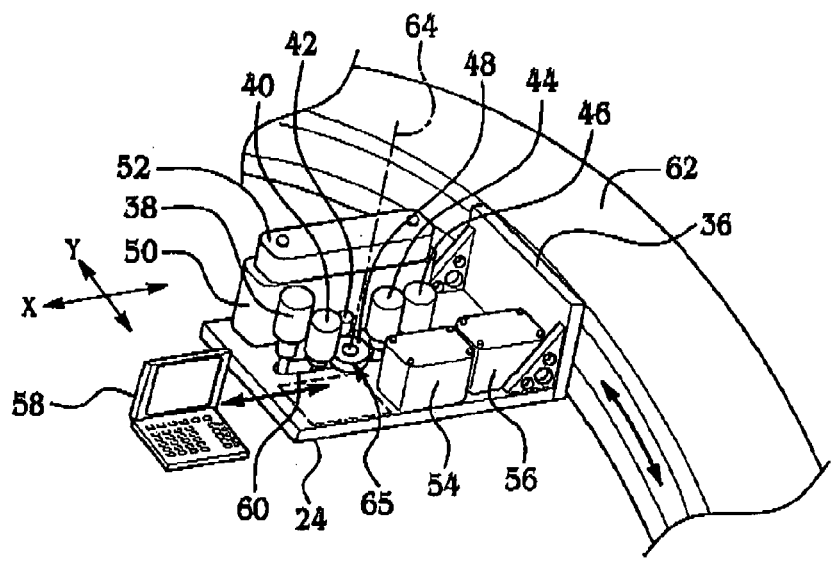
FIG. 3 is a perspective illustration similar to FIG. 1 but showing the apparatus mounted on a crescent unit used for installing fasteners in radial joints.

FIG. 3 illustrates how the apparatus 20 may be arranged to install fasteners in the skin 22 to form radial joints. Connections (not shown) on the crescent plate 36 are slideably received in a crescent support 62 in order to mount the platform 24 for circumferential movement over a curved workpiece (not shown).

Figure 4:
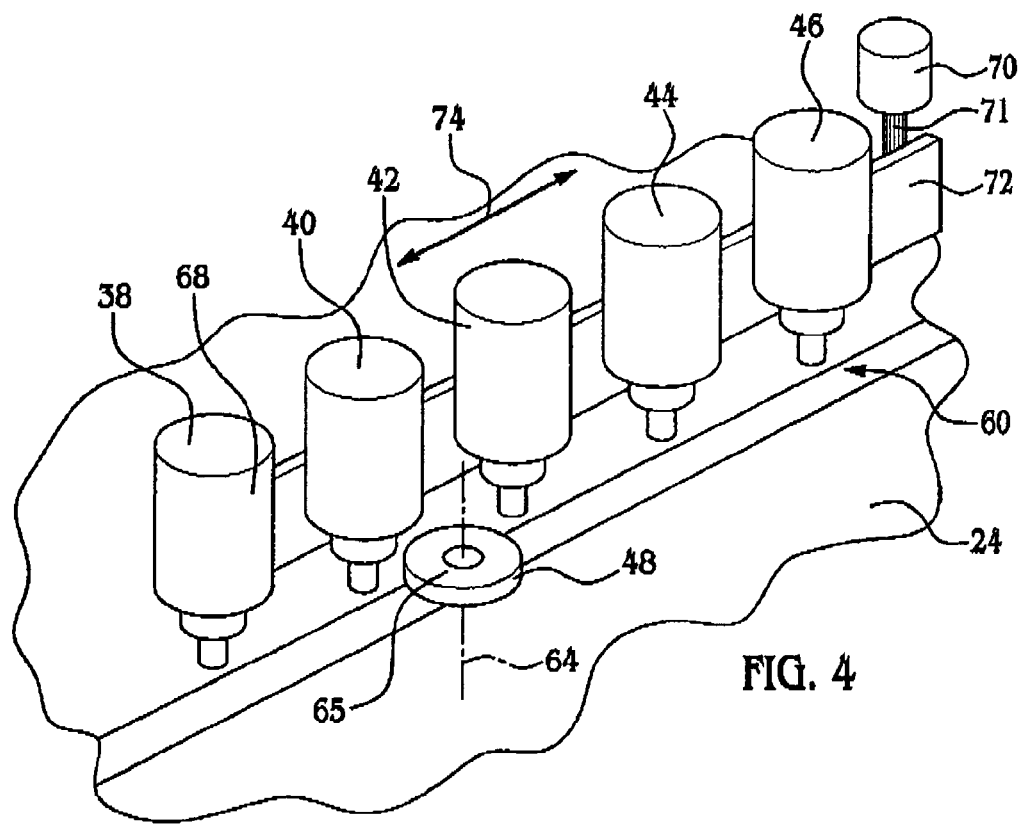
FIG. 4 is a perspective illustration showing how the tools shown in FIGS. 2 and 3 may be mounted for linear movement between a standby position and a process station.

FIG. 4 illustrates one arrangement for mounting the tools 38, 40, 42, 44, 46 on base 24. In this illustrated implementation, the tools 38, 40, 42, 44, 46 are mounted for linear movement between standby positions, and an operating position at the process station 65. Each of the tools 38-46 may be secured to a structure such as a common rail 72 that is slideably mounted by any suitable means (not shown) on the base 24. A drive motor 70 having a splined output shaft 71 engages a gear (not shown) on rail 72. Rotation of the shaft 71 linearly displaces rail 72 in the direction of arrow 74, thereby moving the tools 38-46 between standby positions, and the operating position in which the tool 38-46 has been indexed to the process station 65 and aligned with the process axis 64. Various other well known mechanisms may be used to mount the tools 38-46 for displacement between standby and operating positions on the base 24.

Figure 5:
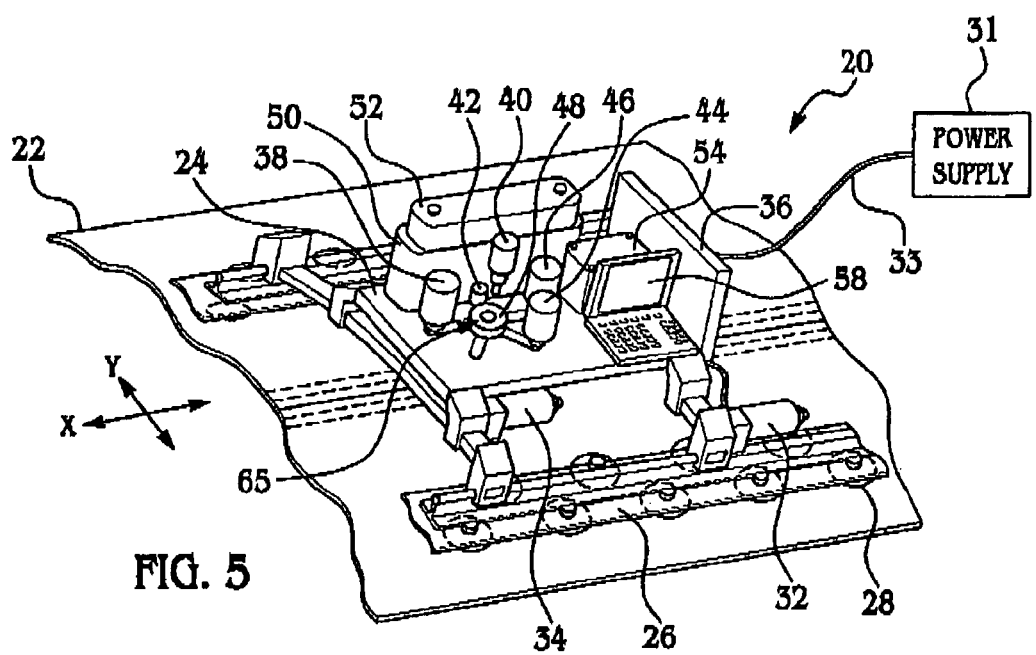
FIG. 5 is a perspective illustration similar to FIG. 2 but showing a radial mounting arrangement of the tools and an off-board power supply.

Another embodiment of the autonomous apparatus 20 is shown in FIG. 5 in which the tools 38-46 are radially arranged around the process station 65 and are mounted for sliding movement on rails 76 between standby and operating positions. It should be noted here that although the apparatus 20 may be completely autonomous, one or more subsystems may be mounted off-board the base 24. For example, the embodiment illustrated in FIG. 5 may include an external, electrical power supply 31 that is connected with the control box 54 by means of a flexible electrical cable 33. In this example, the power supply 31 comprises the only component of the apparatus 20 that is mounted off-board the platform 24, and may be required in some applications where a battery may not provide sufficient supply of electrical power.

Figure 6:
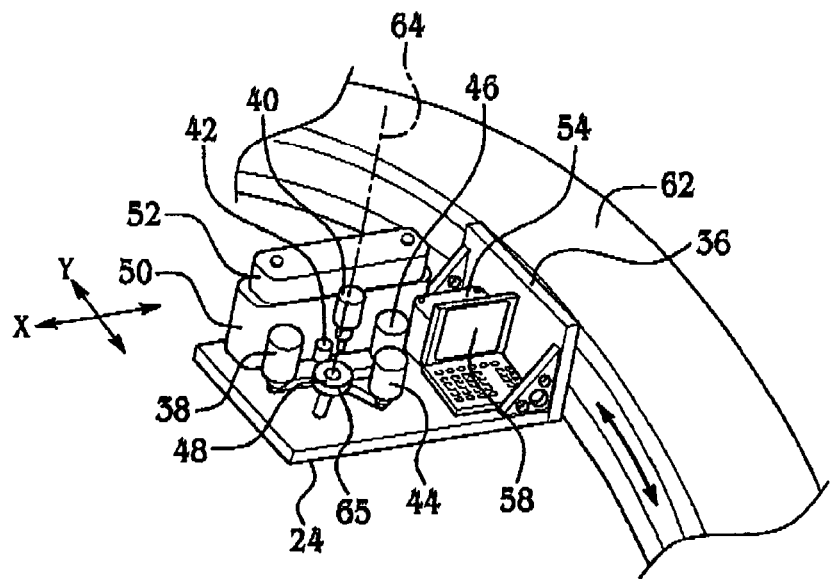
FIG. 6 is a perspective illustration similar to FIG. 3 but showing a radial mounting arrangement for the tools.

FIG. 6 illustrates the use of radially arranged tools 38-46 on a platform 24 that is mounted for circumferential movement on a crescent 62 used to install fasteners forming radial joints.

Figure 7:
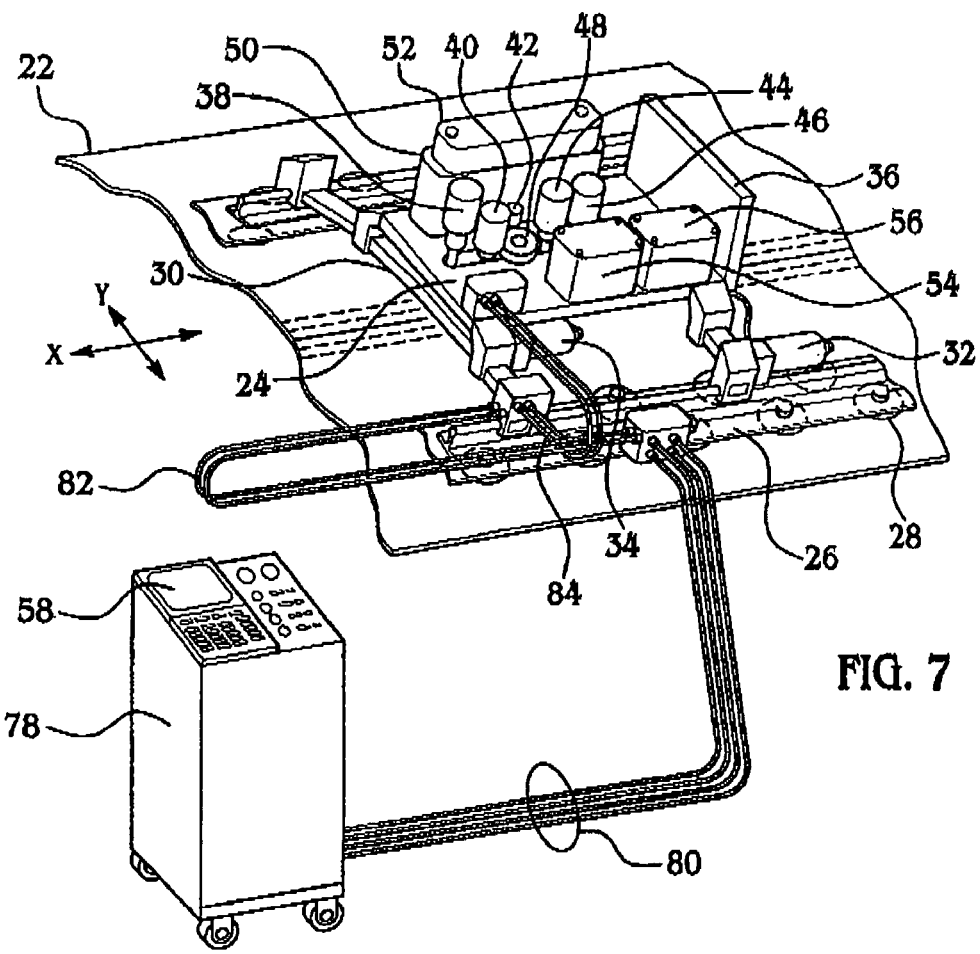
FIG. 7 is an illustration similar to FIG. 2 but showing an off-board, factory floor computer and drive controls connected to the apparatus by control lines.
Figure 8:
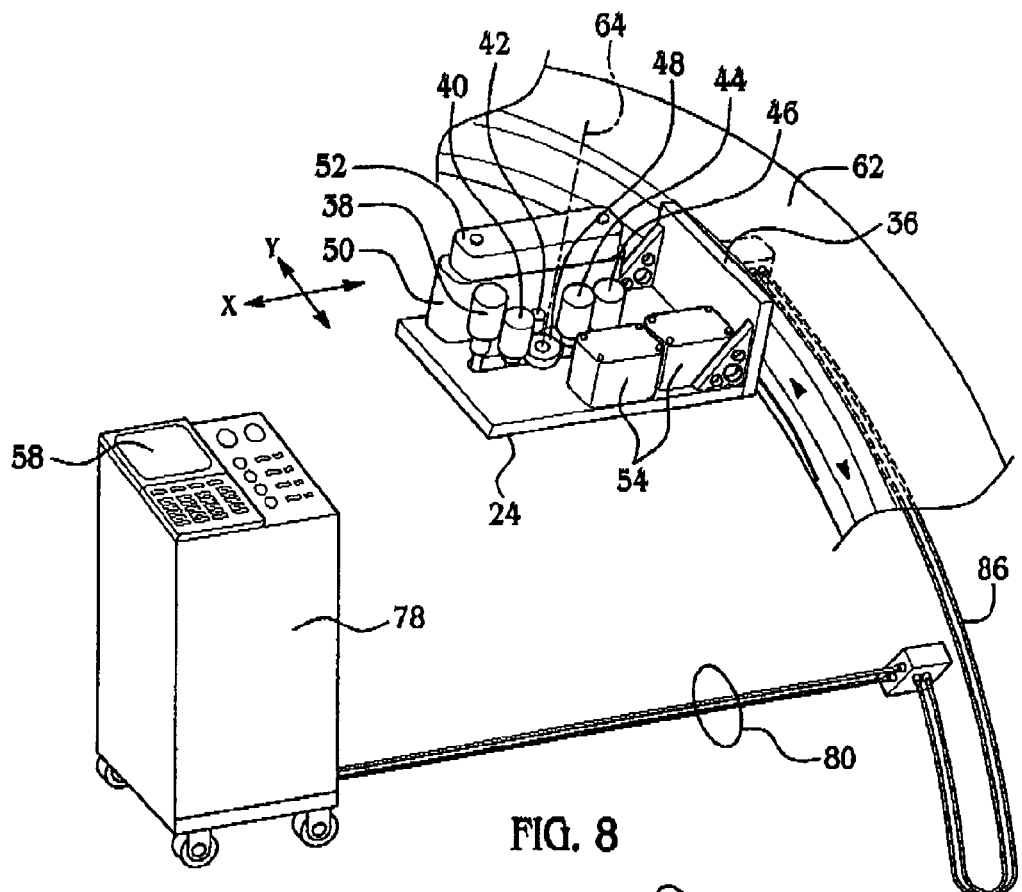
FIG. 8 is a perspective illustration similar to FIG. 3 but showing an off-board, factory floor based computer and drive controllers connected to the apparatus by control lines.

FIGS. 7 and 8 illustrate further embodiments of the autonomous apparatus 20 in which only the computer 58 and related controllers are mounted external to the base 24. In these illustrated examples, flexible electrical and pneumatic cables 80 connect a mobile cart 78 with flex cables 82, 84 that are used to provide electrical and pneumatic power control for systems onboard the base 24.

Figure 9:
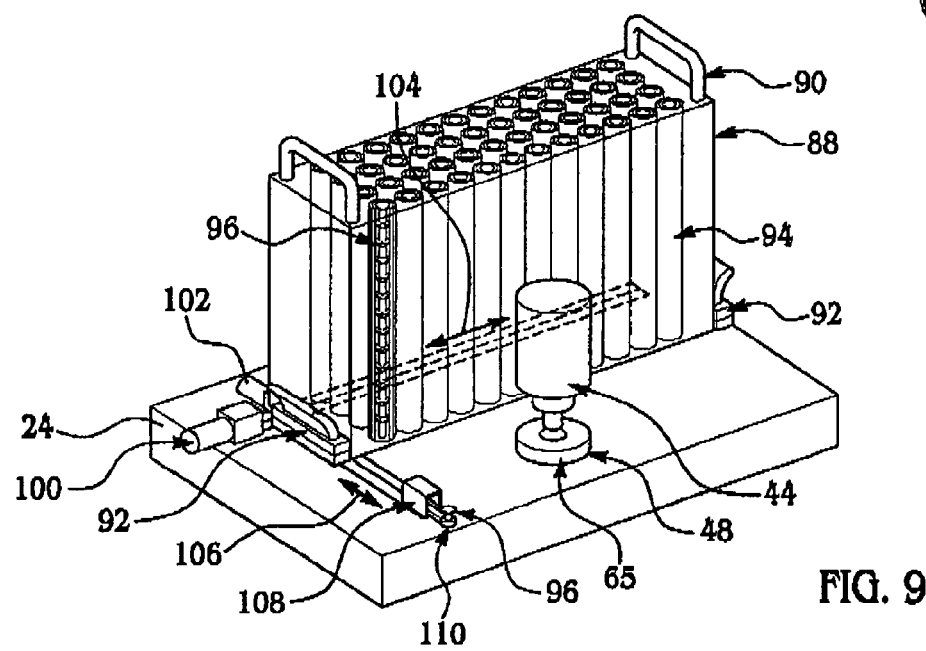
FIG. 9 is a perspective illustration of one implementation of an on-board fastener cassette and fastener transferring device, shown in operative relationship to a drilling tool.
Figure 10:
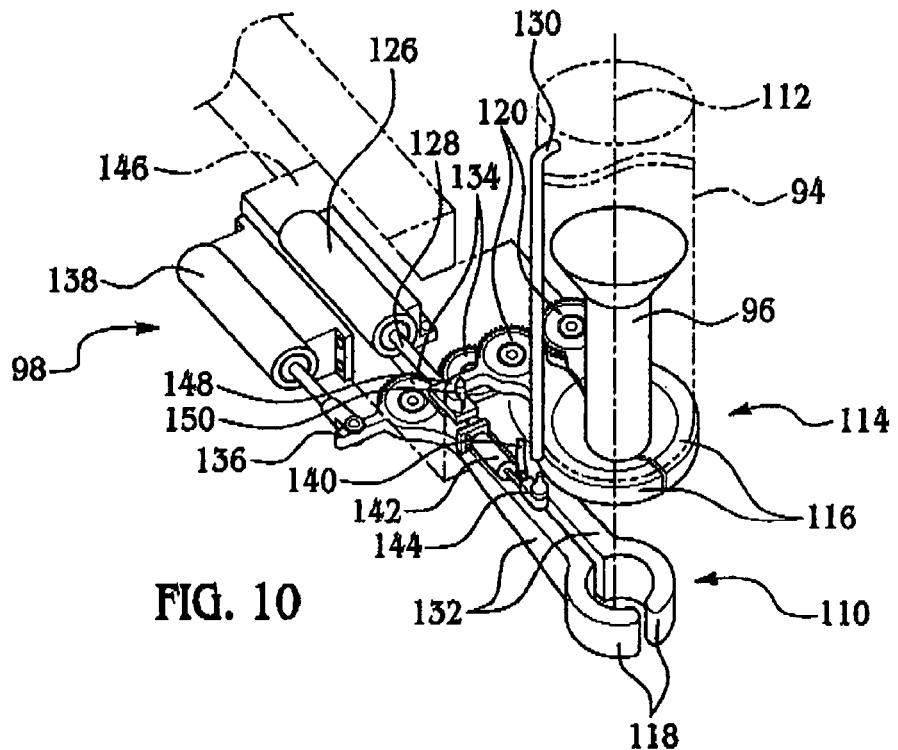
FIG. 10 is a perspective illustration showing details of the fastener transferring device in operative relationship to a fastener storage tube forming part of the cassette illustrated in FIG. 9.

Referring now to FIGS. 9 and 10, the previously described fastener magazine 50 (FIG. 2) may comprise a cassette 88 having handles 90 and quick disconnects 92 that removably mount the cassette 88 on the base 24. The cassette 88 may include a plurality of cartridge-like storage tubes 94 vertically arranged in side-by-side relationship, and each including a plurality of fasteners 96 held in end-to-end relationship. A fastener transferring device 98 may be mounted on the base 24 and functions to transfer individual fasteners 96 from one of the storage tubes 94 to the process station 65. The fastener transferring device 98 may be driven by motor 100 to move along the X-axis 104, and to move along the Y-axis 106. The fastener transferring device 98 may include a gripper mechanism block 108 and a gripper 110 for releasably holding a fastener 96 during the fastener transfer process.

As best seen in FIG. 10, the gripper 110 may include a pair of gripper jaws 118 respectively connected by arms 132 to a pair of integrally formed, meshing gears 134. One of the arms 132 includes a lever 136 that is connected to a gripper actuator 138. Actuator 138 displaces the lever 136, causing the jaws 118 to open or close.

Each of the storage tubes 94 may include a fastener dispensing valve 114 mounted on the bottom end of the tube 94. The dispensing valves 114 each may include a pair of laterally displaceable valve portions 116 connected together by meshing gears 120. One of the valve portions 116 includes a hook shaped arm 148 whose purpose will be described later.

Each of the storage tubes 94 may further include a vacuum/pressure tube 130 that is connected with the upper end of the storage tube 94, and extends downwardly, terminating in an open end adjacent the dispensing valve 114. As previously mentioned, the fasteners 96 are stacked in end-to-end relationship so that their central axes are aligned with the central axis 112 of the tube 94.

The fastener transferring device 98 may further include a dispensing valve actuator 126 having an output shaft 128 to which there is fastened an upstanding finger 148 and a vacuum pressure valve actuator 142. The vacuum pressure valve actuator 142 drives a vacuum pressure valve 144 which is coupled with a source of vacuum pressure (not shown) via a vacuum pressure line 140.

In operation, the gripper arm 98 is driven by motors 100 and 102 under control by the computer 58 to move toward a selected storage tube 94 in the cassette 88. The gripper arm 98 positions the gripper jaws 118 symmetrically around the fastener dispensing axis 112 of the selected tube 94. During this latter mentioned movement, the gripper arm 98 moves around the hook 148 so that the finger 150 is positioned in back of the hook 148 when the gripper jaws 118 reach their pickup position. At this point, the griper jaws 118 are spaced apart in readiness to receive a fastener 96 therebetween.

Next, the vacuum pressure valve actuator 142 is actuated, causing the pressure valve fitting 144 to seat within the end of the pressure tube 130. Then, the dispensing valve actuator 126 is actuated to displace the hook 148 and thereby rotate the valve portions 116 outwardly so as to release a fastener 96. As will be described below in more detail, either gravity, or a combination of gravity and air pressure within the tube 94 force a single fastener 96 downwardly past the open valve portions 116, into the gripper jaws 118. The gripper actuator 138 is then actuated, thereby displacing arm 136 and causing the gripper jaws 118 to close and grip the dispensed fastener 96. Immediately after the fastener 96 has been dispensed, actuator 126 is deactivated, causing the dispenser portions 116 to close, which precludes dispensing of additional fasteners 96 until a future fastener transfer cycle.

With a fastener 96 held within jaws 118, the gripper arm 98 moves the gripper 110 to the processing station 65 and aligns the central axis of the fastener 96 with the process axis 64. The gripper 110 then releases the fastener 96, and returns to a standby position, in readiness to retrieve and transfer the next fastener 96. The fastener 96 is then installed using the inserting tool 38 which inserts the fastener 96 into a previously formed hole in the skin 22.

Figure 11:
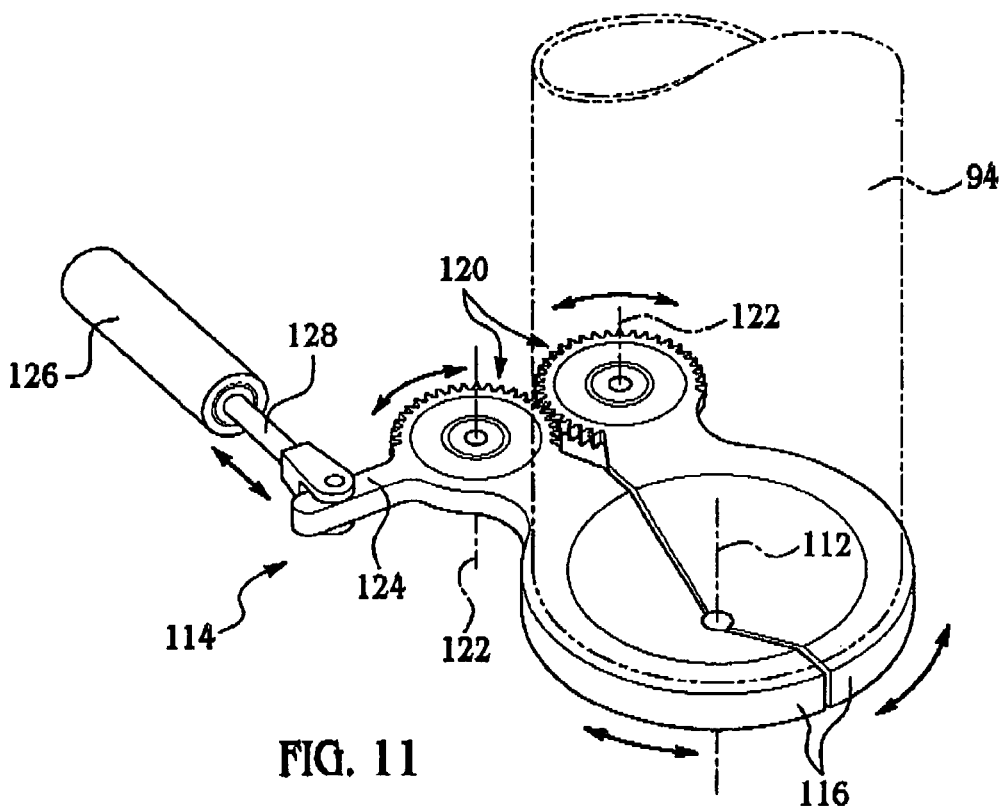
FIG. 11 is a perspective illustration showing an alternate form of the dispensing valve forming part of the fastener tube illustrated in FIG. 9.

An alternate embodiment of the dispensing valve 114 is shown in FIG. 11. The dispensing valve portions 116 rotate about fixed axis 122 meshing gears 120 formed on the valve portions 116 coordinate the simultaneous opening and closing movements of the valve portions 116. An arm 124 in one of the valve portions 116 is pivotally connected to the output shaft 128 of a dispensing valve actuator 126. When the apparatus 20 is ready to dispense a fastener, actuator 126 is energized, forcing the output shaft 128 to move inwardly, resulting in the coordinated opening of the valve portions 116. Unlike the dispensing valve assembly 114 shown in FIG. 10 in which only the valve portions 116 are held on the tube 94, the actuator 126 is permanently connected with the valve portions 116 and does not move with the gripper arm 98.

FIGS. 12a-12e illustrate the progressive steps in dispensing fasteners 96 from the tubes 94. In FIG. 12a, the dispensing valve portions 116 are closed while the gripper jaws 118 are opened. Next, the valve portions 116 are opened to allow the bottom-most fastener 96 to move downwardly under the force of gravity until it is captured between the open gripper jaw 118. In some cases, air pressure may be applied within the tube 94 to aid gravity-feed of the fastener 96. In FIG. 12c, the gripper jaws 118 are closed, thereby tightly gripping the dispensed fastener 96. Next, in FIG. 12d, a vacuum is applied to the tube 94, causing the stacked fasteners 96 to move upwardly so that the bottom-most fastener 96 clears the dispensing valve portions 116. The valve portions 116 are then closed.

Next, in FIG. 12e, the vacuum is removed from the tube 94, allowing the stack of fasteners 196 to move downwardly into engagement with the dispensing valve portions 116, in readiness for the next dispensing cycle. The gripper arm 146 then moves the dispensed fastener 96 to the process station 65 where it is positioned to be inserted into a hole by the inserting tool 38.

Figure 13:
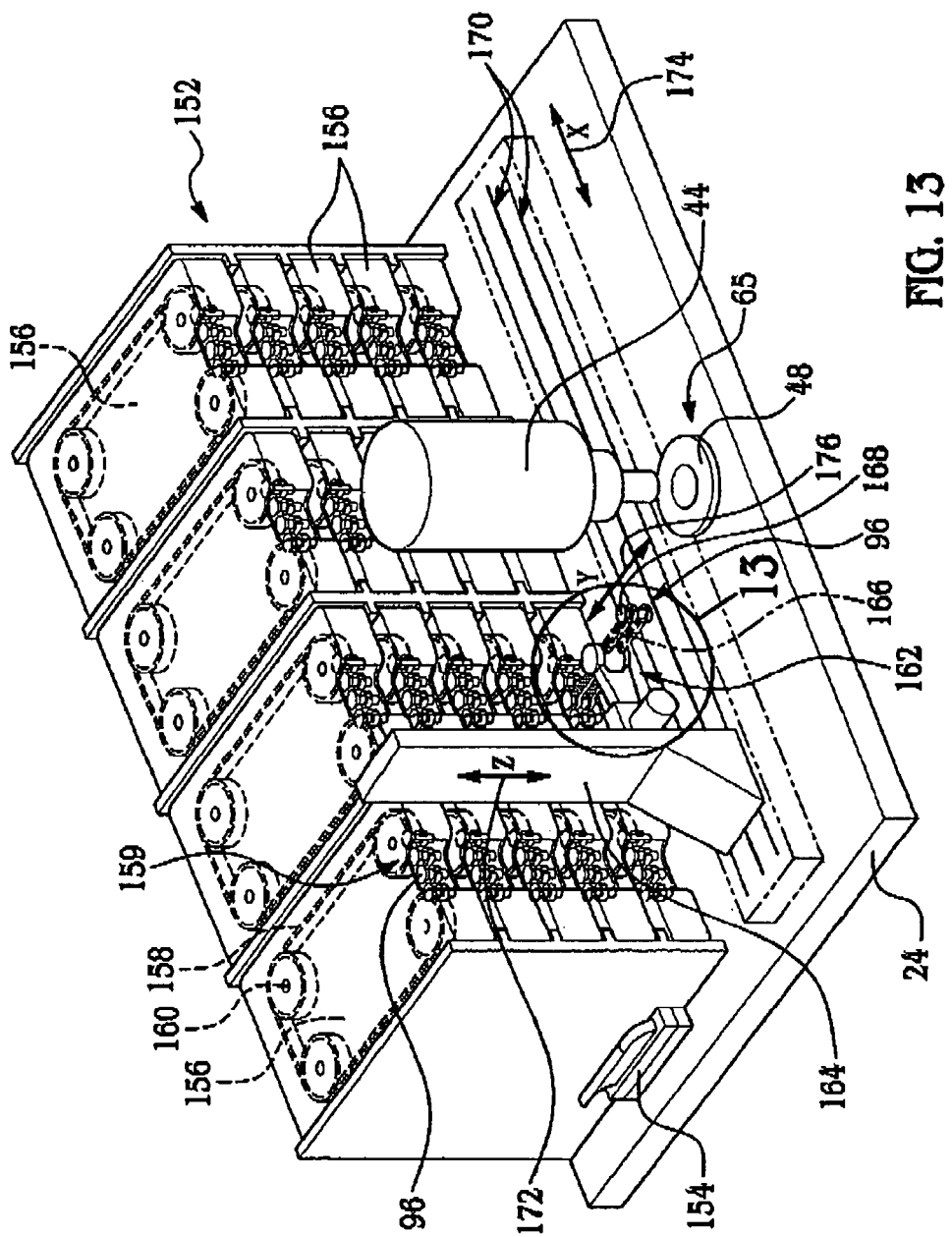
FIG. 13 is a perspective illustration of an alternate implementation of the fastener cassette and fastener transferring device, shown in operative relationship to a drilling tool.
Figure 14:
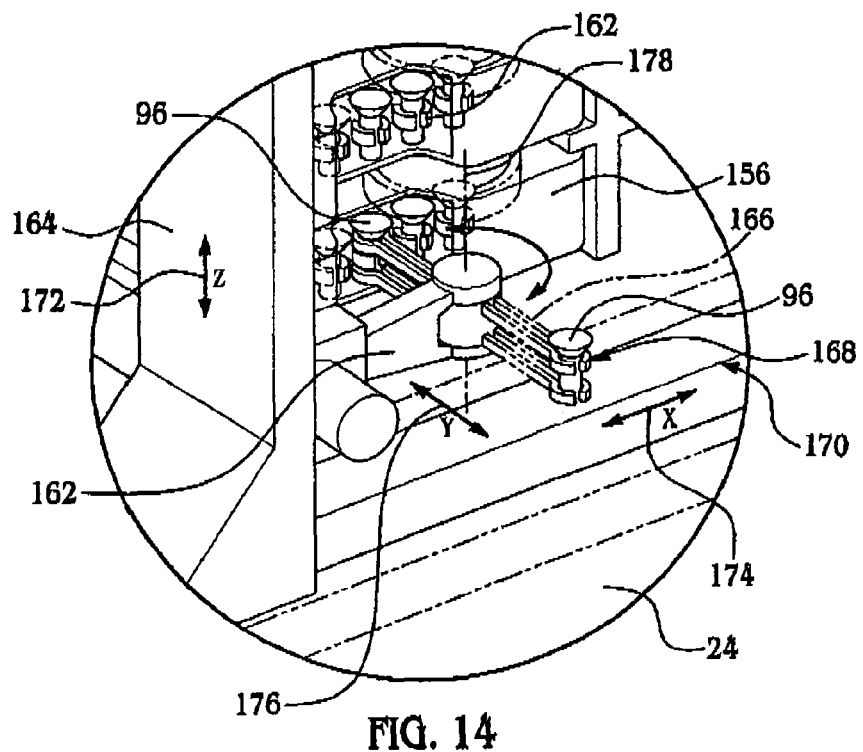
FIG. 14 is an enlarged, perspective illustration of the area designated as "A" in FIG. 13.

Attention is now directed to FIGS. 13 and 14 where another embodiment of the fastener cassette 152 is shown, along with an alternate form of the device 162 for transferring fasteners 96 to the process station 65. The cassette 152 includes a plurality of individual, removable cartridges 156 which may contain and dispense the same or different fasteners 96. Each of the cartridges 156 includes a ribbon 158 of material which may comprise a synthetic tape trained around rollers 160 that allow the fasteners 96 to be indexed around to a dispensing opening 159 in the cartridge 156. The ribbon 158 may include a plurality of holding elements 162 for releasably holding fasteners 96 until they are dispensed.

The device 162 for transferring the fasteners 96 is mounted for vertical sliding movement along a Z axis 172 on a support 164. The support 164 is mounted on ways 170 for sliding movement along a Z axis 174 parallel to the openings 159 in the cartridges 156. The gripping arms 166 include a pair of gripping jaws 168 which engage and grasp fasteners 96. The gripping arms 166 are rotatable about a vertical axis 178 so as to displace fasteners 96 along a Y axis 176. The support 164 is driven along an X axis 174 by any type of suitable motor (not shown), under control, for example of the computer 58 (FIG. 2).

In operation, the computer 58 directs the support 164 and the gripping mechanism 162 to move to one of the cassettes 156 holding fasteners 96 that are to be installed in the skin 22. The support 164 moves to the location along the Z axis 174 where the selected cassette is located. The gripping mechanism 162 then moves along the Z axis 172 to the selected cassette 156, whereupon the gripping arms 166 swing inwardly to grasp one of the fasteners 96. The support 164 and gripping mechanism 162 then move the selected fastener to the process station 65.

Figure 15:
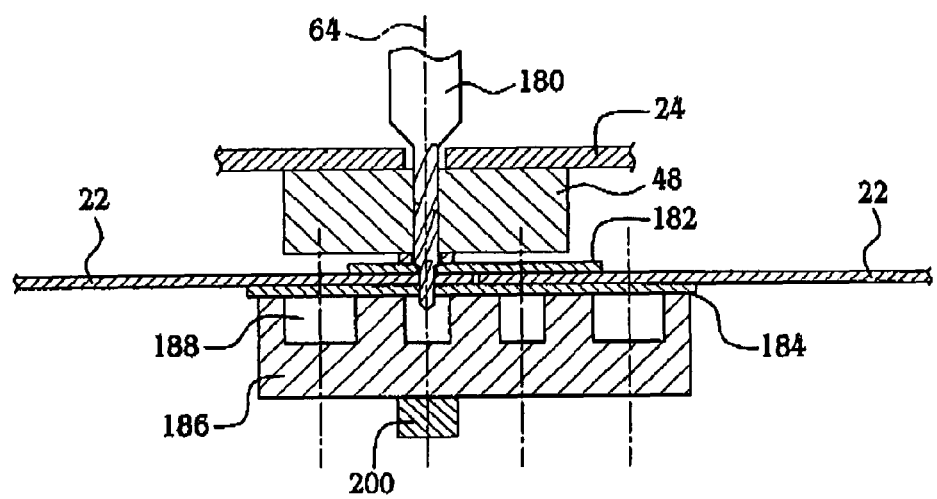
FIG. 15 is a cross sectional illustration showing a hole being drilled in an aircraft skin using the autonomous fastener installation apparatus.

FIG. 15 illustrates a typical hole drilling operation performed by the apparatus 20. The drill tool 44 drives a countersink drill 180 to drill a countersink hole in a workpiece skin 22 having a pair of doublers 182, 184. In the embodiment illustrated in FIG. 15, electromagnet 48 is mounted on the bottom side of the platform 24, rather than the topside of the platform 24 as illustrated in FIG. 2. Since the skin 22 may comprise a non-metallic material, a steel block 186 having cavities 188 is used as a magnetically attractive backing element which is attracted to the electromagnet 48 in order to clamp the skin 22 and doublers 182, 184 in preparation for a drilling operation. Cavities 188 in the steel block 186 are provided to receive the end of the countersink drill in 180. A magnetic sensor 200, such as a Hall-Effect sensor is positioned on the bottom side of the steel block 186 and functions to locate the position steel block 186 beneath the drill 180.

Figure 16:
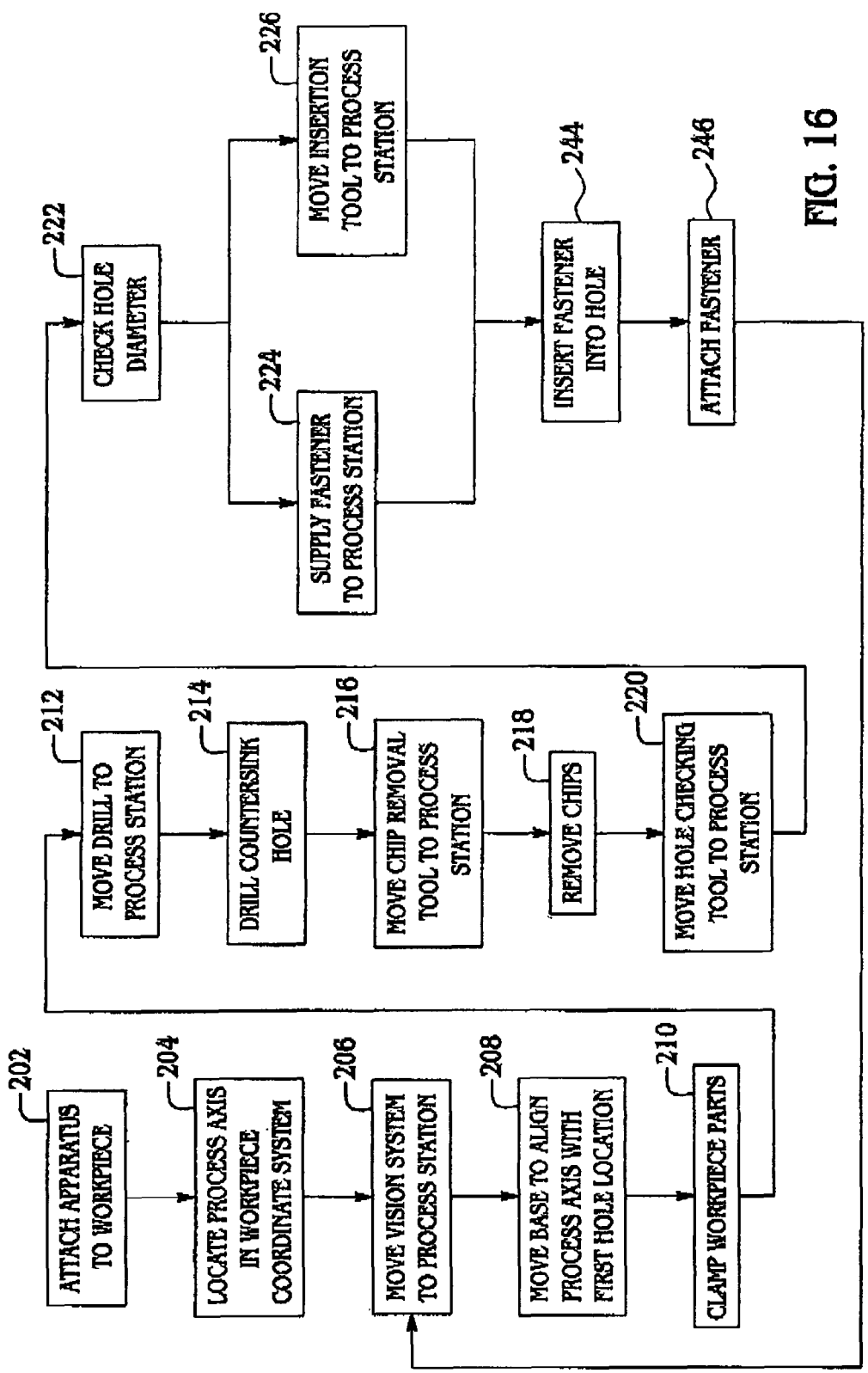
FIG. 16 is a flowchart illustrating steps for installing fasteners according to a method embodiment of the disclosure.

FIG. 16 illustrates the basic steps of a method embodiment for installing fasteners in a workpiece. Beginning at step 202, the apparatus 20 (FIG. 2) is attached to the workpiece 22, which in the illustrated embodiment, is a skin panel of an aircraft. At step 204, the on-board computer 58 locates the process axis 64 relative to features of the workpiece so that the three dimensional position of the process axis 64 is known. Next, at step 206, the vision system tool 46 is moved from its standby position to the process station 65. Using the vision system tool 46, the on-board computer 58 commands the base 24 to move along the X-Y axes 21 at step 208 until the process axis 64 is aligned with a location on the workpiece 22 where a fastener is to be installed.

The workpiece assembly parts, which may include workpiece 22, doublers 182, 184 and steel block 186 (FIG. 15) are then clamped together at step 210. Next, the on-board computer 58 commands the drill tool 44 to move to the process station 65, as shown at step 212. The drill tool 44 then drills the hole at step 214. At step 216, the on-board computer 58 commands the chip removal tool 40 to move to the process station 65, and the chips are removed at step 218.

At step 220, the on-board computer 58 commands the hole checking tool 42 to move to the process station 65, and the diameter (or other features) of the hole is checked at step 222. At step 224, a fastener is selected and supplied to the process station under control of the on-board computer 58.

Figure 17:
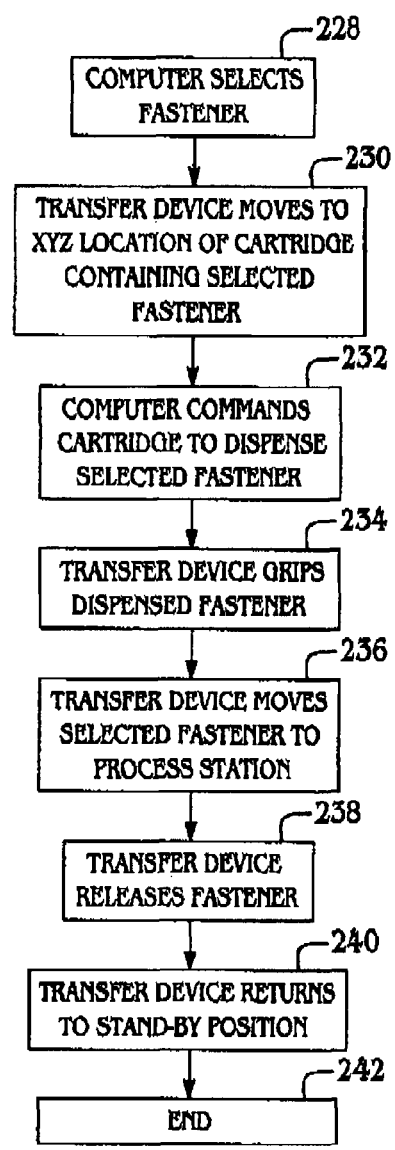
FIG. 17 is a flowchart illustrating steps for supplying a fastener to the process station.

Further details of the fastener supply process (step 224) are shown in FIG. 17. At step 228, the on-board computer 58 selects a fastener based on stored, preprogrammed instructions that specify the type of fastener to be installed at the present location of the process axis 64. Next, at step 230, the on-board computer 58 commands the fastener transferring device 98, 162 (FIGS. 10, 13, 14) to move to the location of the magazine cartridge 94, 156 containing the selected fastener. At step 232, the on-board computer 58 commands the magazine cartridge 94, 156 to dispense the selected fastener. The fastener transferring device 98, 162 then grips the dispensed fastener at step 234, and moves the fastener to the process station 65, as shown at step 236. Following the completion of step 238, the fastener transferring device 98, 162 returns to its standby position at step 240, and the fastener supply process ends at 242.

Under control of the on-board computer 58, the fastener insertion tool 38 is moved from its standby position to the process station 65, as shown at step 226. Steps 224 and 226 can be carried out in series or in parallel with each other, depending on the application and the particular hardware and software used to implement the embodiment. The insertion tool 38 inserts the fastener into the hole at step 244, and the fastener is then attached at step 246. The fastener attachment process depends on the particular application/fastener type and may or may not employ additional tools (not shown) on-board the base 24 to aid in the attachment process. Following attachment of the fastener at step 246, the process steps 208-246 are repeated for installation of a fastener at the next preprogrammed location on the workpiece 22.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus for installing fasteners in a workpiece, comprising:
 a base mounted on a surface of the workpiece such that the base is configured to move over the surface;
 a supply of fasteners mounted on the base;
 at least one tool mounted on the base for installing the fasteners in the workpiece along an installation path;
 a device mounted on the base for transferring fasteners from the supply of fasteners to the tool, the device including a gripping mechanism adapted to releasably hold an individual fastener for operation by the tool, the gripping mechanism configured to move from a position proximate the supply of fasteners to the tool at a location on the installation path; and,
 controls mounted on the base for controlling operation of the at least one tool.

2. The apparatus of claim 1, wherein the fastener supply includes a cassette having a plurality of cartridges, each of the cartridges holding a plurality of fasteners.

3. The apparatus of claim 2, wherein the cartridges include tubes for holding the fasteners in end-to-end relationship to each other.

4. The apparatus of claim 2, wherein the cartridges include a movable ribbon to which the fasteners are releasably attached.

5. The apparatus of claim 2, further comprising a device mounted on the base for transferring fasteners from each of the cartridges to the installation path, transferring the fasteners including moving the gripping mechanism in three axes of motion.

6. The apparatus of claim 1, wherein the gripping mechanism comprises jaws for gripping a fastener and further comprising a transporter for moving the jaws over the base.

7. The apparatus of claim 1, wherein the fastener supply includes:
 a plurality of tubes, each of the tubes holding a plurality of the fasteners in end-to-end relationship to each other, and
 a valve on each of the tubes for dispensing individual fasteners from the tube.

8. The apparatus of claim 1, further comprising a device mounted on the base for transferring fasteners from the fastener supply to the installation path, wherein the fastener transferring device includes jaws for gripping a fastener and a transporter for moving the jaws over the base.

9. The apparatus of claim 1, further comprising:
 a plurality of tools mounted on the base for performing fastener installation operations; and
 means for shifting each of the tools from a standby position to an operating position.

10. The apparatus of claim 1, further comprising:
 a drive for moving the base over the workpiece; and,
 a power supply mounted on the base for powering the drive.

11. The apparatus of claim 1, wherein the controls include a programmed computer mounted on the base for controlling the operation of the at least one tool and the movement of the base over the surface of the workpiece.

12. The apparatus of claim 1, wherein the workpiece is an aircraft.

13. The apparatus of claim 1, wherein the workpiece is an aircraft and the apparatus is specified for use in a pre-production phase of construction of the aircraft.

14. The apparatus of claim 1, wherein the workpiece is a subassembly of an aircraft.

15. The apparatus of claim 1, wherein the workpiece is an aircraft and the apparatus is used in maintenance and rework of the aircraft.

16. An autonomous apparatus for installing fasteners in a workpiece, comprising:
 a base including a process station where fastener installation processes are performed, the base removeably connected to a surface of the workpiece such that the base is configured to move to a plurality of locations on the workpiece;

a drive assembly for moving the base over the surface of the workpiece;

a supply of fasteners mounted on the base;

a fastener transferring device mounted on the base for transferring fasteners from the supply of fasteners to the process station, the fastener transferring device including jaws for gripping a fastener provided by the supply of fasteners and a transporter for moving the jaws between the supply of fasteners and the process station proximate one of the locations;

a plurality of tools mounted on the base for performing operations related to the installation of the fasteners;

a tool changer; and, controls mounted on the base for controlling operation of at least one of the fastener transferring device, the tools and the drive assembly.

17. The autonomous apparatus of claim 16, wherein the supply of fasteners includes a cassette removably mounted on the base, the cassette including a plurality of cartridges each holding a plurality of fasteners.

18. The autonomous apparatus of claim 17, wherein each of the cartridges includes a tube for holding the fasteners in end-to-end relationship to each other, and a valve for dispensing the fasteners from the tube.

19. The autonomous apparatus of claim 17, wherein each of the cartridges includes a movable ribbon to which the fasteners are releasably attached.

20. The autonomous apparatus of claim 16, further comprising a power supply mounted on the base for supplying power to drive assembly, the fastener transferring device, the tools and the tool changer.

21. The autonomous apparatus of claim 16, wherein the controls include a programmed computer.

22. The autonomous apparatus of claim 16, wherein the tools include a drill for drilling a hole in the workpiece and a inserter for inserting a fastener into the hole.

23. The autonomous apparatus of claim 16, wherein the workpiece is an aircraft.

24. An apparatus for installing fasteners in a workpiece, comprising:

a base removeably mounted on a surface of the workpiece so as to provide for movement over the surface of the workpiece;

a tool mounted on the base for performing fastener installation operations on the workpiece;

a magazine mounted on the base for holding a supply of fasteners; and, a device mounted on the base for transferring fasteners from a cassette to the tool, the device comprising jaws for gripping a fastener and a transporter for moving the jaws between the magazine and the tool.

25. The apparatus of claim 24, wherein the magazine includes a cassette for dispensing individual fasteners, and a quick release device for removably mounting the cassette on the base.

26. The apparatus of claim 24, wherein the magazine includes a plurality cartridges, each of the cartridges containing a plurality of fasteners, and, the device transfers individual fasteners from each of the cartridges to the tool.

27. The apparatus of claim 26, wherein the cartridges are removably mounted on the magazine.

28. The apparatus of claim 24, further comprising a releasable connection between the magazine and the base allowing the magazine to be removed from the base.

29. The apparatus of claim 26, wherein each of the cartridges includes a tube for holding the fasteners in end-to-end relationship to each other, and a valve for dispensing the fasteners from the tube.

30. The apparatus of claim 26, wherein each of the cartridges includes a movable ribbon to which the fasteners are releasably attached.

31. The apparatus of claim 24, further comprising a controller mounted on the base for controlling the operation of the fastener transferring device.

32. The apparatus of claim 24, wherein the workpiece is a skin on an aircraft.

* * * * *